United States Patent [19]
Wiese

[11] 3,813,103
[45] May 28, 1974

[54] MECHANICAL SEAL WITH IMPROVED LEAKAGE CONTROL

[75] Inventor: Winfred J. Wiese, Whittier, Calif.

[73] Assignee: Borg-Warner Corporation, Chicago, Ill.

[22] Filed: Apr. 12, 1972

[21] Appl. No.: 243,377

[52] U.S. Cl. .................. 277/27, 277/74, 277/75
[51] Int. Cl. ............................. F16j 15/44
[58] Field of Search ............... 277/25, 27, 74, 75

[56] References Cited
UNITED STATES PATENTS

| | | | |
|---|---|---|---|
| 3,100,647 | 8/1963 | Lee et al. | 277/75 X |
| 3,339,930 | 9/1967 | Tracey | 277/27 |
| 3,360,272 | 12/1967 | Blom et al. | 277/27 X |
| 3,410,565 | 11/1968 | Williams | 277/27 X |
| 3,628,799 | 12/1971 | Wiese | 277/27 |

Primary Examiner—Samuel B. Rothberg
Attorney, Agent, or Firm—Donald W. Banner

[57] ABSTRACT

A mechanical seal assembly having a rotary sealing ring and a nonrotatable sealing ring carried by a housing and a rotary shaft and having opposed radial sealing faces. A back-up ring engages the nonrotatable sealing ring and has a marginal portion exposed in a pressure chamber in the housing, and the nonrotatable sealing ring and the back-up ring are ported to allow flow of fluid into the pressure chamber from between the rotary sealing ring and the nonrotatable sealing ring. The rotary sealing ring is notched at circumferentially spaced locations and has radial surfaces between the notches to intermittently open and close the ports in the nonrotatable ring. A number of such seal assemblies are arranged in tandem.

12 Claims, 6 Drawing Figures

MECHANICAL SEAL WITH IMPROVED LEAKAGE CONTROL

BACKGROUND OF THE INVENTION

1. Field of the Invention:

This invention relates to mechanical seals having a pair of relatively rotatable sealing rings with opposed generally radially disposed sealing faces biased one towards the other by fluid pressure in the seal housing. Such seals are notorious for sealing rotary shafts extending from a stationary housing, such as a pump shaft rotatable in a pump housing.

Various efforts have been made to control the leakage between the seal faces so that the leakage rate is uniform. However, when the housing pressure varies, the force applied tending to maintain the seal faces in proper relation axially with respect to one another also varies in two directions. In this connection, the force applied axially to urge the seal rings toward one another is a function, usually, of a spring and housing pressure acting directly upon the exposed cross-sectional area of one of the rings, and there is a counterforce in the direction tending to open the seal faces which is determined by the pressure gradient of the fluid film between the seal faces. In a well designed seal which is functioning properly, the two faces are substantially equalized. Due to differences in reaction time, however, a sudden pressure change in the housing may cause an instantaneous increase or decrease in the force in its working direction due to the time required for a change in the effective pressure gradient. Accordingly, a sudden change in housing pressure may result in the seal faces being excessively squeezed together or spread apart, and as a consequence, seal wear or excessive leakage may result.

Controlled leakage of mechanical seals has been a problem in tandem seal assemblies, where a comparatively high housing pressure exists and is broken down through successive seal stages. One problem encountered in the use of tandem mechanical seals is the cycling of changes in the leakage rate through the successive seal stages which may cause the seal components to be subjected to cyclical pressure variations.

Additionally, in high pressure seals, say, in the case of about 2,000 p.s.i. or more, deflection of the nonrotating seal supported by the housing resulting from deflection of the housing portion which backs up the nonrotating seal, can cause dishing of the radial face and improper face-to-face relation with the rotating seal ring. Sealing effectiveness and stability are adversely affected in such circumstances.

Generally, in mechanical seals wherein housing pressure can deflect the back-up for nonrotatable seal ring, with resultant distortion of the nonrotatable seal ring, the distortion tends to reduce the effective annular seal face area, thereby increasing the unit loading and causing ultimate seal failure due to reduced leakage and excessive heat. In a tandem seal arrangement reduced leakage through the first stage seal will cause reduced housing pressure applicable to the next seal stage, with resultant increased leakage rate. The increased leakage of the second stage seal causes a higher housing pressure applicable to the next seal stage and a reduced leakage rate. Thus, in stages or so-called tandem seal arrangements, there exists in most cases an oscillation or varying leakage rate and pressure cycle. Such cycles are known to occure over periods ranging from a few seconds to 10 or more minutes in multi-stage seals wherein the housing pressure is on the order of 2,100 p.s.i. The magnitude of the pressure changes in the various stages is known to range between about 50 p.s.i. to 150 p.s.i.

Another aspect of mechanical seal operation which affects seal life and the effectiveness of seals, as well as the cycling in the leakage rate of staged or tandem seals is the stability of the lubricating film between the opposed faces which film is affected by heat and pressure, and under adverse conditions, staged seals are unable to effectively maintain constant leakage rates at the various stages, notwithstanding the use of notches or grooves in one or the other of the opposed rings which improve the lubricating characteristics.

The background considerations in the construction and operation of mechanical seals in high pressure applications have resulted in substantial scientific exploration and testing of various configurations in an effort to understand and remedy the problems of seal failure and cycling leakage rates in staged seals.

2. Description of the Prior Art:

In my prior U.S. Pat. No. 3,628,799, issued Dec. 21, 1971, for Mechanical Seal With Leakage Control, there is disclosed a mechanical seal in which the support flange for the nonrotatable seal ring is formed with a pressure chamber which contains a back-up ring for the nonrotatable seal ring, and wherein a cantilevered portion of the back-up ring is exposed to pressure in the pressure chamber supplied thereto through passages in the nonrotatable seal ring and its back-up ring. The pressure is derived from between the opposed seal faces at a selected radial location and is a function of the pressure gradient. This provides a structure whereby the effect of housing pressure tending to deflect the support for the back-up ring is offset by opposite deflecting force applied to the back-up ring, whereby the nonrotating seal ring remains uniform and is not distorted. Such a seal assembly has a more uniform leakage rate than conventional seal assemblies, including those wherein one of the seal rings if notched or grooved to improve lubricating film stability. The use of notches in a seal ring is disclosed, for example, in U.S. Pat. No. 3,479,039, issued Nov. 18, 1969.

SUMMARY OF THE INVENTION

The present invention involves utilizing a structure generally corresponding to that in my aforesaid U.S. Pat. No. 3,628,799, but wherein the pressure applied to the pressure chamber is supplied from the housing to the ported back-up ring through cooperative passages in both the rotating and the nonrotatable seal ring.

More particularly, the present invention resides in constructing the rotating and nonrotatable seal rings in such a manner that the pressure supplied to the back-up ring pressure chamber intermittently varies during rotation of the rotatable ring between a pressure determined by the gradient between the seal faces and a higher pressure.

The object of the invention is to provide a mechanical seal which operates in a more stable manner and which, when incorporated in a staged seal assembly, minimizes variations in the leakage rate at the seal stages and therefore maintains a constant pressure drop between stages.

In accomplishing the foregoing, as well as other objectives, the present invention employs a pressure chamber for the back-up ring for one of a pair of relatively rotatable mechanical sealing rings, to which pressure is supplied through the back-up ring and the ring which it backs up, intermittently from a location between the seal faces at which one gradient pressure exists and at which a different pressure exists due to the provision of radial notches spaced circumferentially of the other ring and communicating at the periphery of the latter ring with the pressure in the housing. In a preferred form, the notches extend radially to a location at which the port leading to the pressure chamber is at least partially uncovered and exposed to housing pressure.

This invention possesses many other advantages, and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

DESCRIPTION OF THE PREFERRED EMBODIMENTS

Figure 1:
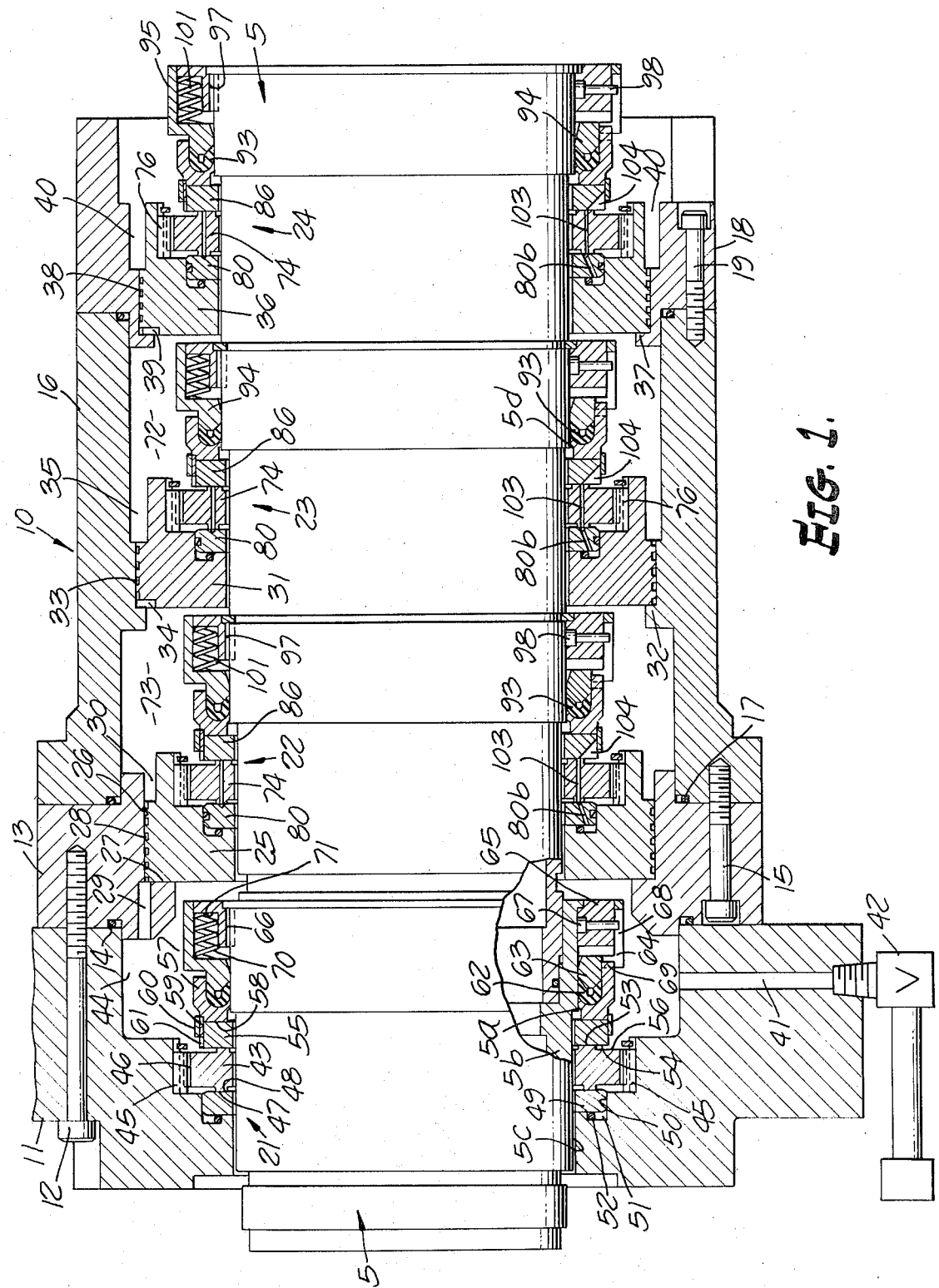
FIG. 1 is a view in longitudinal section, with certain parts shown in elevation, of a multi-stage mechanical seal assembly embodying the invention.

As seen in the drawings, the mechanical seal assembly comprises a rotatable sleeve 5 adapted to be affixed to a rotatable shaft, which extends from the pump housing (not shown). Concentrically disposed about the rotatable sleeve 5 is a nonrotatable assembly 10 consisting of a seal flange 11 adapted to be mounted, as is well known, on the pump housing. Connected to the flange 11 by suitable fasteners 12 is a housing section 13 which carries suitable sealing ring means 14 engageable with the flange 11. Connected to the housing section 13 by suitable fasteners 15 is an elongated housing section 16 having suitable sealing ring means 17 engageable with the housing section 13. Finally, the seal housing comprises an end section 18 connected to the housing section 16 by suitable fasteners 19, there being suitable sealing ring means 20 between the housing sections 16 and 18. As will be more apparent hereinafter, the sectional housing enables the progressive assembly of the seal components on the sleeve 5.

Interposed between the rotatable sleeve 5 and the nonrotatable assembly 10, is at least one and preferably a plurality of axially spaced seal stages or assemblies, respectively designated 21, 22, 23 and 24, whereby fluid is retained within the pump housing and the pressure of such fluid is progressively reduced through the seal stages 24, 23 and 22 to a comparatively low pressure at the seal stage 21. The staging of mechanical seals is well known and results in an assembly wherein the differential pressure across any selected seal stage is only a fraction of the total differential pressure between the inside of the housing and the outside thereof, and wherein any given seal stage is therefore better able to operate effectively over long periods of time. In the seal assembly of FIG. 1, the seal stage 21 is conventional; whereas, the seal stages 22, 23 and 24 each consists of novel structure in accordance with the present invention, whereby the pressure difference across the successive seal stage is maintained in a constant or stable state, as compared with conventional staged mechanical seals wherein the pressure difference across successive seal stages is known to vary cyclically due to variations in the leakage rate of successive seal stages. In this connection, it will be understood that if the leakage rate through the right-hand seal stage 24 were to increase, the pressure difference across that stage will decrease, and therefore the intermediate seal stage 23 will experience a higher pressure tending to decrease the leakage rate thereof, which would in turn result in a reduction in the pressure applied to the seal stage 22.

Heretofore, means have been provided to assist in maintaining a uniform staged pressure drop across the various seal stages by providing a controlled leakage through a restricted by-pass between the successive seal stages. The present seal may also utilize such a passageway. Accordingly, at the seal stage 22 is a nonrotatable flange member 25 which is disposed within a bore 26 in the housing section 13, the flange 25 abutting at its left-hand end with a stop shoulder 27 provided in the housing section 13. About the outer periphery of the flange 25 is a helical groove 28 which communicates at its opposite ends with ports 29 and 30. Correspondingly, the seal stage 23 includes a flange member 31 which abuts with a stop 32 within the body section 16 and has an external helical groove 33 communicating with ports 34 and 35. In addition, the seal stage 24 includes a flange 36 which abuts with a stop 37 in the housing section 18 and has an outer helical groove 38 communicating with ports 39 and 40. The seal flange 11 has an outlet port 41 leading to an adjustable discharge valve 42, whereby, by adjustment of the valve 42, the internal housing pressure is adapted to be reduced progressively between the seal stages to a nominal outlet pressure. However, it will also be understood, that the actual pressure between seal stages will be dependent upon the leakage rate of the seal means at the respective seal stages.

The seal stage 21 is illustrated as a conventional mechanical seal, as previously indicated, and for illustrative purposes comprises a nonrotatable seal ring 43 disposed in a seal chamber 44 within the flange 11 and held against rotation by suitable keys 45 which engage in outer peripheral key slots 46 in the ring 43. Typically, the ring 43 may be composed of a material such as carbon and is backed up by suitable means. In the illustrative seal, the ring 43 has at its left side a radial sealing face 47 engaging an opposed radial sealing face 48 of a back-up ring 49 which is also nonrotatable, the opposing faces 47 and 48 being complemental and lapped for sealing co-engagement. The back-up ring 49 is disposed within an internal groove 50 in the flange 11, the groove 50 having an axial extension 51 forming a chamber to which fluid pressure from the chamber 44 finds access past the outer periphery of the back-up ring 49, leakage from the chamber being prevented by an O-ring seal 52. The other or inner side of the ring 43 has a radial seal face 53 opposing a radial seal face 54 of a rotatable seal ring 55, these opposing faces being lapped for complemental sealing engagement. Accordingly, leakage of fluid from the housing, and more particularly, from the chamber 44, will be at a minimal rate between the seal faces 53 and 54, and in order to enhance the lubrication of the seal faces by maintaining a fluid film therebetween, the nonrotatable seal ring 43 is provided with a suitable number of radial notches 56 in the seal faces 53, whereby at circumferentially spaced location, the seal face 53 is of reduced radial width, and the presence of housing fluid is assured for the purpose of lubrication.

In the illustrated embodiment, the rotatable seal ring 55 may be composed of a very hard material, such as titanium carbide and carried by a separate ring 57 which is driven by the sleeve 5 and is biased axially to the left by the pressure of fluid in the seal chamber 44 to maintain the sealing relationship between the radial sealing faces 47 and 48 and 53 and 54. If preferred, however, the rotatable seal ring 55 and the carrier ring 57 may be constructed as a unit of material which is durable but more readily workable, such as stellite, as is well known in the mechanical seal field. In the case of the illustrated structure, the carrier ring 57 has a radial face 58 engaged with the opposing wall of the seal ring 55 and a suitable number of circumferentially spaced keys 59, which are held in place by an external band 60, engaged in key slots 61 in the outer periphery of the seal ring 55, so that rotation is transmitted to the seal ring 55 from the carrier 57.

Within the carrier 57 is packing 62 adapted to be circumferentially expanded by an expander ring 63 into sealing engagement between the carrier ring 57 and the outer periphery 5a of an enlarged end piece 5b of the sleeve 5. The sleeve end piece 5b is reduced in diameter at 5c to provide a balance diameter, as is well known, to balance out the desired percentage of the seal area exposed to fluid pressure. The expander ring 63 has a skirt 64 extending axially therefrom about a drive ring 65 which is keyed at 66 to the shaft sleeve 5. This drive ring 65, at circumferentially spaced locations, has a suitable number of radial drive pins 67 engaged in elongated slots 68 in the skirt 64 to transmit rotation to the latter, and rotation is imparted to the carrier 57 by suitable lugs 69 on the carrier and projecting into the notches 68 of the skirt 64. The slots 68 also enable longitudinal movement of the expander 63 under the influence of fluid pressure and under the influence of a suitable number of coiled compression springs 70 effectively interposed between the expander 63 and the drive ring 62 in spring cavities 71.

Figure 2:
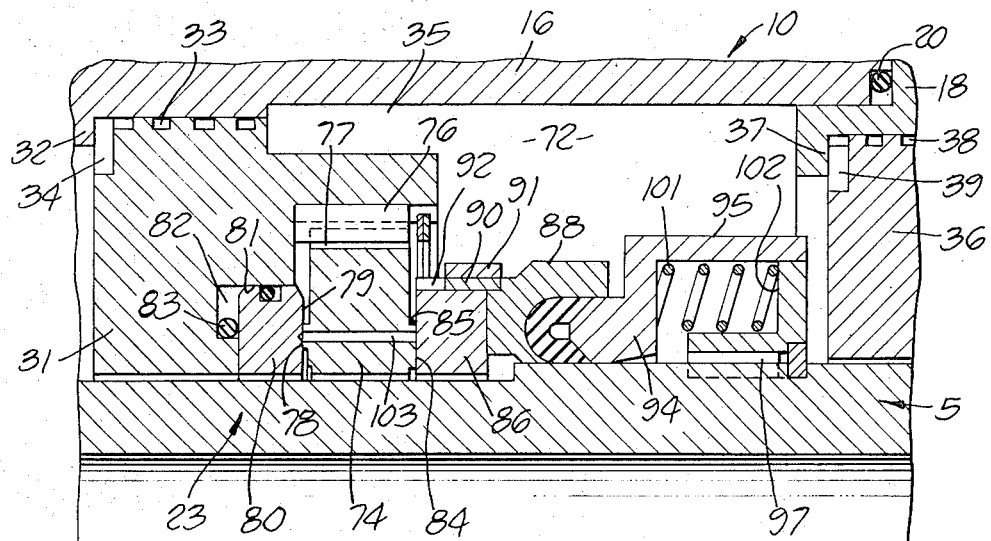
FIG. 2 is an enlarged longitudinal section of one of the novel seal stages.
Figure 2:
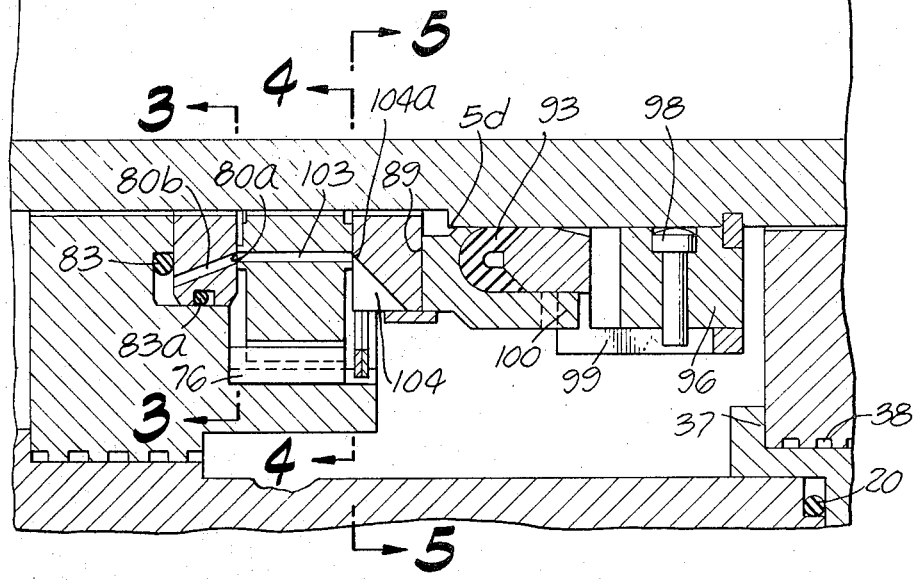
Figure 3:
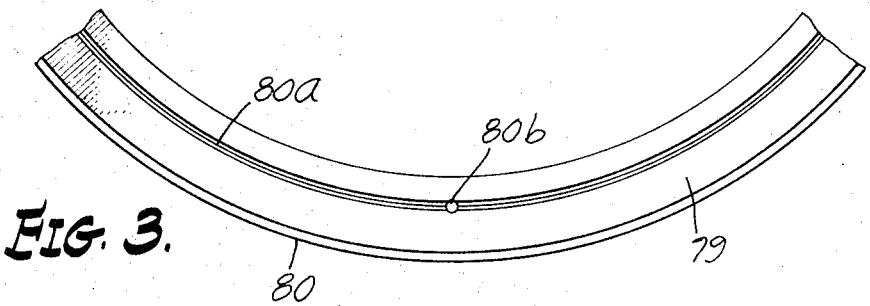
FIG. 3 is a fragmentary view, as taken on the line 3—3 of FIG. 2, showing a portion of the back-up ring.
Figure 4:
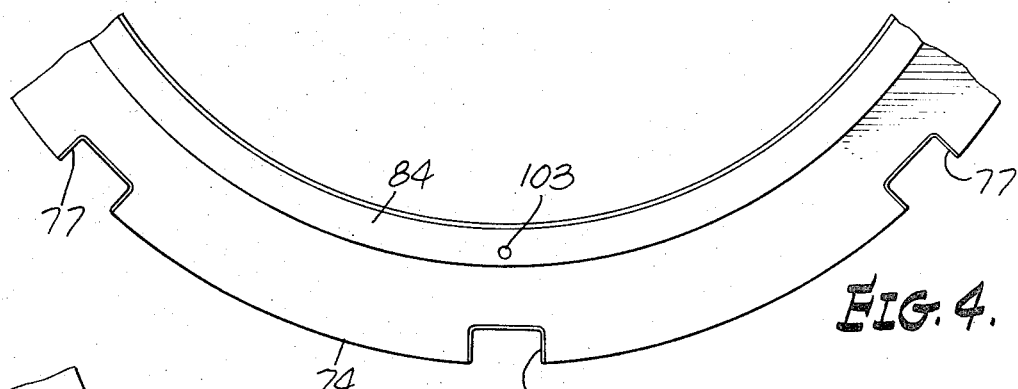
FIG. 4 is a fragmentary view, as taken on the line 4—4 of FIG. 2, showing a portion of the nonrotatable ring.

The seal assembly structure thus far described, including the use of seal stages 22, 23 and 24 is of substantially conventional, but in accordance with the present invention, each of the stages 22, 23 and 24, as well as any additional seal stages which may be employed are constructed in a similar manner to the seal stage 23 which will now be described in detail, as seen in FIG. 2.

The seal stage 23 is disposed in a seal chamber 72, the pressure in which is a function of pressure reduction through the helical passage 38 which opens into the seal chamber 72 and through the helical passage 33 which leads from the seal chamber 72 into the chamber 73 of the seal stage 22, as well as the leakage rate through the mechanical seal assembly between the housing section 16 and the sleeve 5. Included in the seal stage 23 is a nonrotatable seal ring 74 disposed in the seal chamber 72 within the housing section 16 and held against rotation by suitable keys 76 which engage in outer peripherial key slots 77 in the ring 74. Typically, the ring 74, like the ring 43, may be composed of a material such as carbon, and it has at its left side a radial sealing face 78 engaging an opposed radial sealing face 79 of a back-up ring means 80 which is also nonrotatable, the opposing faces 78 and 79 being complemental and lapped for sealing co-engagement. The back-up ring 80 is disposed within an internal groove 81 in the flange 31, the groove 81 having an axial extension 82 forming a chamber to which fluid pressure from the chamber 72 finds access through passage means in the back-up ring and in the nonrotatable ring 74, as will be later described. The passage means in the back-up ring 80 comprises an annular groove 80a and at least one port 80b leading from the groove 80a into the chamber 82. Leakage from the chamber 82 is prevented by an O-ring seal 83 at one side and an external O-ring 83a on the outer periphery of the back-up ring 80. THe other or inner side of the ring 74 has a radial seal face 84 opposing a radial seal face 85 of a rotatable seal ring 86, these opposing faces being lapped for complemental sealing engagement.

Accordingly, leakage of fluid from the housing, and more particularly, from the chamber 72, into the chamber 73 will be between the seal faces 84 and 85.

In the illustrated embodiment, the rotatable seal ring 86 may be composed of a very hard material, such as titanium carbide and carried by a separate ring 88 which is driven by the sleeve 5 and is biased axially to the left by the pressure of fluid in the seal chamber 72 to maintain the sealing relationship between the radial sealing faces 78, 79 and 84, 85. If preferred, however, the rotatable seal ring 86 and the carrier ring 88 may be constructed as a unit of material which is durable but more readily workable, such as stellite, as is well known in the mechanical seal field. In the case of the illustrated structure, the carrier ring 88 has a radial face 89 engaged with the opposing wall of the seal ring 86. A suitable number of circumferentially spaced keys 90 are held in place by an external band 91, engaged in key slots 92 in the outer periphery of the seal ring 86, so that rotation is transmitted to the seal ring 86 from the carrier 88.

Within the carrier 88 is packing 93 adapted to be circumferentially expanded by an expander ring 94 into sealing engagement between the carrier ring 88 and the outer periphery 5d of the sleeve 5 which is of enlarged diameter to provide a desired balance. THe expander ring 94 has a skirt 95 extending axially therefrom about a drive ring 96 which is keyed at 97 to the shaft sleeve 5. This drive ring 96 at circumferentially spaced locations has a suitable number of radial drive pins 98 engaged in elongated slots 99 in the skirt 95 to transmit rotation to the latter, and rotation is imparted to the carrier 88 by suitable lugs 100 on the carrier and projecting into the slots 99 of the skirt 95. The slots 99 also enable longitudinal movement of the expander 94 under th influence of fluid pressure and under the influence of a suitable number of coiled compression springs 101 effectively interposed between the expander 94 and the drive ring 96 in spring cavities 102.

AS previously indicated, passage means are provided including the annular groove 80a and the port 80b in the back-up ring 80 for admitting fluid pressure into the back-up ring pressure chamber 82. Such passage means also includes one or more axially extended ports 103 in the nonrotatable seal ring 74. In the illustrated embodiment, there is a pair of such ports 103 at diametrically spaced locations and disposed in alignment with the annular groove 80a of the back-up ring 80 at one end and opening at the other end between the peripheries of the rotatable seal ring 86. In the embodiment now being described, the passage means for admitting pressure to the back-up ring chamber 82 also includes a number of circumferentially spaced radially outwardly opening notches 104 suitably formed in the rotatable seal ring 86 and establishing communication between the seal chamber 72, at the outer periphery of the seal ring 86, and a radially inwardly spaced location determined by the radial depth of the notch 104 to the inner end 104a of the notch 104. In the embodiment now being described, moreover, the notch 104 is formed by an angular base wall extending between the seal face 85 and the outer periphery of the seal ring 86, but as will be later described, the notch may be of another construction. As best seen in FIG. 2, the inner end 104a of the respective notches 104 is so located that during rotation it will intersect with the ports or openings 103 in the nonrotatable ring 74.

As a result of this structure, it will be apparent that the notches 104 result in the intermittent application of a pressure to the back-up ring chamber 82 which varies between a pressure determined by the pressure gradient between the seal faces 84 and 85 and the housing pressure at the slots 104, and that the pressure to which the ports 103 are exposed between a lower pressure when the unslotted portions of the seal ring 86 confront the openings 103 and higher pressure when the slots intersect the ports 103 and expose the chamber 82. Accordingly, it is apparent that the pressure in the back-up ring chamber 82 is a pulsating, alternately high and low pressure, which is applied to the portion of the back-up ring 80 which is essentially cantelevered in the chamber 82 to apply a variable force directed toward the seal ring 74. This force directed towards the seal ring 74 assists in preventing dishing or distortion of the seal ring 74 which might otherwise occur as a result of the axial force applied to the seal ring 86 towards the back-up ring 80, when the flange 31, due to high pressure in the chamber 72, is deflected in a dish-like manner.

The tendency of seal supporting flanges, such as the flange 31, to deflect or be deformed under high pressure differentials thereacross and the use of a back-up ring, such as the ring 80, and pressure in the back-up ring chamber derived from between the relatively rotating seal faces via ports in the rotatable seal ring, constitute the subject matter of my aforementioned U.S. Pat. No. 3,628,799, and tests have shown that if the preliminary stage seal or seals in a multi stage assembly are constructed in accordance with that patent, but without notches corresponding to the notches 104, described above, a significant reduction in the occurrence of leakage rate variations between successive stages results, as compared with conventional seal assemblies, such as the seal stage 21, described above. However, in such a staged seal, in the absence of the notches 104, leakage rate variations nevertheless cyclically occur and the case therefore has eluded technical evaluation by those sophisticated in the field of mechanical seals.

The present invention involves the discovery that the addition of notches, such as the notches 104, in the seal ring 86 further reduces the cyclical leakage rate changes, so that the progressive staged pressure drop through the staged seal assembly remains substantially constant, apparently due to the application of the pulsating pressure to the back-up ring chamber 82 as relative rotation occurs. Tests show that while good results are obtained when the inner end 104a of the notch is variously located within the radial range in which the ports 103 are wholly uncovered or wholly covered, the best results have been obtained, in terms of leakage stabilization, when the ports 103 are only partially opened. Thus, in the illustrative embodiment, the inner end 104a of the notch 104 intersects the ports 103 so as to uncover approximately two-thirds of the port diameter.

Figure 6:
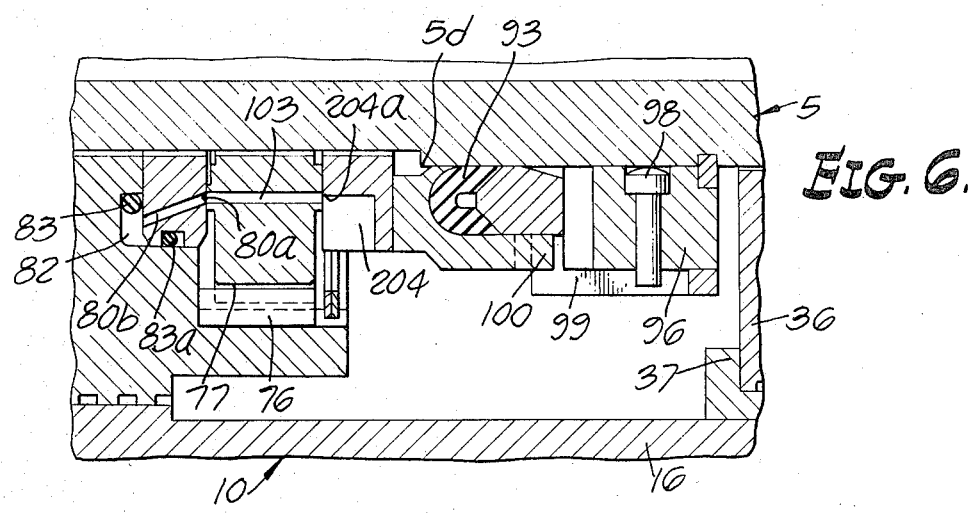
FIG. 6 is a fragmentary longitudinal section showing a modified construction.

While notches 104 may be conveniently formed, as shown best in FIG. 2, by milling an angular slot, such a notch form would inherently result in a variation in the radial depth of the notches when the seal face 85 is being lapped or resurfaced for the purpose of service or repair. Accordingly, in FIG. 6, a modified notch configuration is illustrated wherein the notches 204 are shown as terminating at an inner end wall 204a which extends axially with respect to the ports 103, thereby enabling substantial material removal for purposes of repair or service without altering the location of the end 204a of the notch 204.

Figure 5:
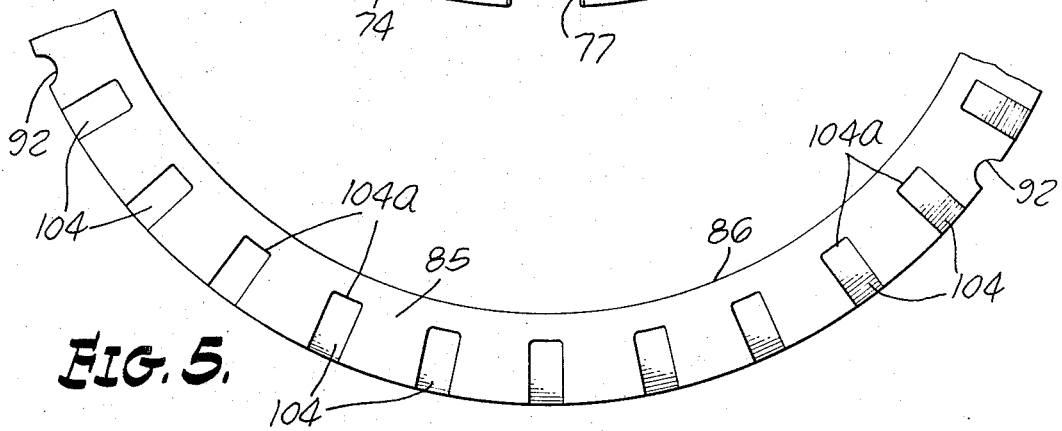
FIG. 5 is a fragmentary view, as taken on the line 5—5 of FIG. 2, showing a portion of the rotatable ring.

In addition, while the notches 104, and for that matter the notches 204, may be formed as shown in FIG. 5, in which the inner end 104a is flat and therefore on a line which is chordal with respect to the ports 103 in the nonrotatable ring, the notches may take other forms, without requiring specific illustration herein.

In other words, the crux of the present invention involves the provision of notches, such as the notches 104 and 204, of a selected form and of a selected radial depth, as compared with the diameter of the seal assembly and the size of the ports 103, such that a pulsating pressure is applied to the back-up ring chamber 82 to apply a force to the seal ring 74 to hold it in its proper form and to stabilize the leakage rate between the rings 74 and 86.

Since seals are shown at the stages 22 and 24 which are the same as that shown at the stage 23, further description is superfluous. However, it should be noted that more or less seal stages may be employed, if desired. While the seal stages 22, 23 and 24 are successively larger sleeve diameters for ease of assembly, the seals may, by modifying the sleeve construction, be of similar diameters.

I claim:

1. A mechanical seal assembly for sealing a rotary shaft to a housing containing fluid under pressure and having a shaft opening through which the shaft extends, said mechanical seal assembly comprising:

a. rotatable sealing ring means mounted on the shaft for rotation therewith, said rotatable sealing ring means having limited movability axially of the shaft;
  b. non-rotatable sealing ring means fixedly mounted on the housing;
  c. said rotatable and said non-rotatable sealing ring means having opposed, generally radial sealing surfaces disposed in relatively rotatable sealing relationship, said surfaces defining therebetween an annular sealing zone;
  d. said housing having a support flange surrounding the shaft, said flange supporting said non-rotatable sealing ring means on its side opposite to its said generally radial sealing surface and along an annular surface spaced radially inward from its outer periphery;
  e. said flange and said non-rotatable sealing ring means defining therebetween an annular cavity disposed radially outward from said annular surface;
  f. means for sealing said cavity;
  g. said non-rotatable sealing ring means having a cantilevered peripheral portion that is free to flex into said cavity;
  h. said peripheral portion having a first, generally radial annular surface contiguous to said cavity and exposed to the pressure of fluid therein, and a second, generally radial surface on the opposite side of said peripheral portion and exposed to the pressure of the fluid within the housing;
  i. first fluid passage means extending through said non-rotatable sealing ring means and having, at one of its ends, a first port opening into said annular sealing zone and, at the other of its ends, having a second port opening into said cavity; and
  j. second fluid passage means in said rotatable sealing ring means having at one end, a plurality of arcuately spaced ports opening into said annular sealing zone, said second fluid passage means communicating, at the other of its ends, with said fluid within the housing.

2. A mechanical seal assembly as defined in claim 1, wherein said second fluid passage means comprises a plurality of arcuately spaced, radial notches formed in the outer peripheral portion of said rotatable sealing ring means.

3. A mechanical seal assembly as defined in claim 2, wherein said notches communicate successively with said first port upon rotation of said rotatable sealing ring means.

4. A mechanical seal assembly as defined in claim 3, wherein said notches communicate with said first port to only partially open the latter.

5. A mechanical seal assembly as defined in claim 2, wherein said notches have inner end walls that extend axially of said rotatable sealing ring means.

6. A mechanical seal assembly for sealing a rotary shaft to a housing containing fluid under pressure and having a shaft opening through which the shaft extends, said mechanical seal assembly comprising:

a. a rotatable sealing ring mounted on and rotatable with the shaft, said sealing ring having limited movability axially of the shaft;
  b. a non-rotatable sealing ring fixedly mounted on the housing;
  c. said sealing rings having opposed, generally radial sealing surfaces disposed in relatively rotatable sealing relationship, said surfaces defining therebetween an annular sealing zone;
  d. a back-up ring supporting said non-rotatable sealing ring on its side opposite to its generally radial sealing surface;
  e. said back-up ring and said non-rotatable sealing ring having opposed, generally radial sealing surfaces in stationary sealing relationship;
  f. said housing having a support flange surrounding the shaft, said flange supporting said back-up ring on its side opposite to its said generally radial sealing surface, and along an annular surface spaced radially inward from its outer periphery;
  g. said flange and said back-up ring defining therebetween an annular cavity disposed radially outward from said annular surface;
  h. means for sealing said cavity;
  i. said back-up ring having a cantilevered peripheral portion that is free to flex into said cavity;
  j. said peripheral portion having a first, generally radial annular surface contiguous to said cavity and exposed to the pressure of fluid therein, and a second, generally radial surface on the opposite side of said peripheral portion and exposed to the pressure of fluid within the housing;
  k. first fluid passage means extending through said non-rotatable sealing ring and said back-up ring, said first fluid passage means having, a one of its ends, a first port opening into said annular sealing zone and, at the other of its ends, having a second port opening into said cavity; and
  l. second fluid passage means in said rotatable sealing ring means having at one end, a plurality of arcuately spaced ports opening into said annular sealing zone, said second fluid passage means communicating, at the other of its end, with said fluid within the housing.

7. A mechanical seal assembly as defined in claim 6, wherein said second fluid passage means comprise a plurality of arcuately spaced, radial notches formed in the outer peripheral portion of said rotatable sealing ring.

8. A mechanical seal assembly as defined in claim 7, wherein said notches communicate successively with said first port means upon rotation of said rotatable sealing ring.

9. A mechanical seal assembly as defined in claim 8, wherein said notches communicate with said first port to only partially open the latter.

10. A mechanical seal assembly as defined in claim 7, wherein said notches have inner end walls that extend axially of said rotatable sealing ring.

11. A staged, rotary, mechanical fluid pressure seal assembly for sealing a rotary shaft to a housing containing fluid under high pressure and having a shaft opening through which the shaft extends for progressively reducing the pressure through the seal stages, said assembly including: low pressure final stage sealing means and at least one preliminary stage sealing means exposed to the high pressure fluid in said housing, said preliminary stage sealing means comprising:

a. rotatable sealing ring means mounted on the shaft for rotation therewith, said rotatable sealing ring means having limited movability axially of the shaft;
b. non-rotatable sealing ring means fixedly mounted on the housing;
c. said rotatable and said non-rotatable sealing ring means having opposed, generally radial sealing surfaces disposed in relatively rotatable sealing relationship, said surfaces defining therebetween an annular sealing zone;
d. said housing having a support flange surrounding the shaft, said flange supporting said non-rotatable sealing ring means on its side opposite to its said generally radial sealing surface and along an annular surface spaced radially inward from its outer periphery;
e. said flange and said non-rotatable sealing ring means defining therebetween an annular cavity disposed radially outward from said annular surface;
f. means for sealing said cavity;
g. said non-rotatable sealing ring means having cantilevered peripheral portion that is free to flex into said cavity;
h. said peripheral portion having a first, generally radial annular surface contiguous to said cavity and exposed to the pressure of fluid therein, and a second, generally radial surface on the opposite side of said peripheral portion and exposed to the pressure of the fluid within the housing;
i. first fluid passage means extending through said non-rotatable sealing ring means and having, at one of its ends, a first port opening into said annular sealing zone and, at the other of its ends, having a second port opening into said cavity; and
j. second fluid passage means in said rotatable sealing ring means having at one end, a plurality of arcuately spaced ports opening into said annular sealing zone, said second fluid passage means communicating, at the other of its ends, with said fluid within the housing.

12. A staged, rotary, mechanical fluid pressure seal assembly for sealing a rotary shaft to a housing containing fluid under high pressure and having a shaft opening through which the shaft extends for progressively reducing the pressure through the seal stages, said assembly including: low pressure final stage sealing means and at least one preliminary stage sealing means exposed to the high pressure fluid in said housing, said preliminary stage sealing means comprising:
a. a rotatable sealing ring mounted on and rotatable with the shaft, said sealing ring having limited movability axially of the shaft;
b. a non-rotatable sealing ring fixedly mounted on the housing;
c. said sealing rings having opposed, generally radial sealing surfaces disposed in relatively rotatable sealing relationship, said surfaces defining therebetween an annular sealing zone;
d. a back-up ring supporting said non-rotatable sealing ring on its side opposite to its generally radial sealing surface;
e. said back-up ring and said non-rotatable sealing ring having opposed, generally radial sealing surfaces in stationary sealing relationship;
f. said housing having a support flange surrounding the shaft, said flange supporting said back-up ring on its side opposite to its said generally radial sealing surface, and along an annular surface spaced radially inward from its outer periphery;
g. said flange and said back-up ring defining therebetween an annular cavity disposed radially outward from said annular surface;
h. means for sealing said cavity;
i. said back-up ring having a cantilevered peripheral portion that is free to flex into said cavity;
j. said peripheral portion having a first, generally radial annular surface contiguous to said cavity and exposed to the pressure of fluid therein, and a second, generally radial surface on the opposite said of said peripheral portion and exposed to the pressure of fluid within the housing;
k. first fluid passage means extending through said non-rotatable sealing ring and said back-up ring, said first fluid passage means having, at one of its ends, a first port opening into said annular sealing zone and, at the other of its ends, having a second port opening into said cavity; and
l. second fluid passage means in said rotatable sealing ring means having at one end, a plurality of arcuately spaced ports opening into said annular sealing zone, said second fluid passage means communicating, at the other of its end, with said fluid within the housing.

* * * * *

UNITED STATES PATENT OFFICE
CERTIFICATE OF CORRECTION

Patent No. 3,813,103             Dated    May 28, 1974

Inventor(s)    Winfred J. Wiese

It is certified that error appears in the above-identified patent and that said Letters Patent are hereby corrected as shown below:

Column 12, line 32, "said" should read -- side --.

Signed and sealed this 24th day of September 1974.

(SEAL)
Attest:

McCOY M. GIBSON JR.                C. MARSHALL DANN
Attesting Officer                  Commissioner of Patents